(12) United States Patent
Imai

(10) Patent No.: US 8,704,916 B2
(45) Date of Patent: Apr. 22, 2014

(54) SYSTEMS AND METHODS FOR FOCUS TRANSITION

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/473,408

(22) Filed: May 16, 2012

(65) Prior Publication Data

US 2012/0257068 A1    Oct. 11, 2012

Related U.S. Application Data

(63) Continuation-in-part of application No. 13/083,970, filed on Apr. 11, 2011.

(51) Int. Cl.
*H04N 5/262*    (2006.01)

(52) U.S. Cl.
USPC ............................................. 348/239; 348/346

(58) Field of Classification Search
USPC ..................... 348/207.1, 239, 333.02, 346
See application file for complete search history.

(56) References Cited

U.S. PATENT DOCUMENTS

| | | | |
|---|---|---|---|
| 6,900,841 B1 * | 5/2005 | Mihara | 348/345 |
| 2003/0103670 A1 | 6/2003 | Schoelkopf | |
| 2008/0259176 A1 | 10/2008 | Tamaru | |
| 2009/0136148 A1 * | 5/2009 | Lim et al. | 382/255 |
| 2009/0167928 A1 | 7/2009 | Asukabe | |
| 2009/0256947 A1 | 10/2009 | Ciurea | |
| 2009/0297057 A1 | 12/2009 | Ho | |
| 2009/0310885 A1 | 12/2009 | Tamaru | |
| 2010/0020285 A1 | 1/2010 | Berge | |
| 2010/0295987 A1 | 11/2010 | Berge | |
| 2011/0273577 A1 * | 11/2011 | Saito | 348/222.1 |
| 2012/0026596 A1 | 2/2012 | Berge | |

OTHER PUBLICATIONS

Williams, John, "Blending Exposures in Photoshop", Sep. 6, 2007.
O'Donnell, Christopher, "How to Reduce Your Depth of Field in Photoshop", Guides, Post Production, Nov. 10, 2010.
Puckett, Sean, A plug-in for the camera RAW image processing program Bibble, Foxy-Special Effects; http://www.nexi.com/foxy, downloaded Apr. 5, 2011.
Neumann, Jan, "Polydioptric Camera Design," Polydioptric Camera Design—VideoGeometry :: Home Page of Jan Neumann, downloaded Mar. 7, 2011.
Achanta, Radhakrishna, "SLIC Superpixels,", Ecole Polytechnique Federale de Lausanne Technical Report 149300, Jun. 2010.
Drucker, Fabio, Dickinson College, Carlisle, PA, "Fast Superpixels for Video Analysis," WMVC09.

\* cited by examiner

*Primary Examiner* — Gevell Selby
(74) *Attorney, Agent, or Firm* — Canon U.S.A., Inc. IP Division

(57) ABSTRACT

Systems and methods for setting a focal transition for an image capturing device receive data including user selections of focal settings for respective areas of interest in an image, generate a first interface that includes indicators of the focal settings for the respective areas of interest, receive data including user selections of transitional focal settings for respective transitional areas between the areas of interest, and generate a second interface, the second interface including indicators of the transitional focal settings for the respective transitional areas between the areas of interest.

5 Claims, 18 Drawing Sheets

| INDEX | DISTANCE [M] | SHARPNESS | OPTICAL APERTURE |
|---|---|---|---|
| 1 | 1 | 0 | 1.25 |
| 2 | 1 | 5 | 5.6 |
| 3 | 1 | 8 | 6.2 |
| 4 | 1 | 10 | 7.2 |
| 5 | 2 | 0 | 1.4 |
| 6 | 2 | 5 | 5.9 |
| 7 | 2 | 8 | 6.4 |
| 8 | 2 | 10 | 7.4 |
| ... | ... | ... | ... |
| ... | 20 | 1 | 9.6 |
| ... | ... | ... | ... |
| ... | 80 | 4 | 12.5 |
| ... | ... | ... | ... |
| ... | 200 | 7 | 18.6 |
| ... | ... | ... | ... |
| ... | 10,000 | 1 | 21 |
| ... | ... | ... | ... |
| ... | ∞ | 10 | 32.0 |

FIG. 12

SYSTEMS AND METHODS FOR FOCUS TRANSITION

CROSS REFERENCE TO RELATED APPLICATIONS

This application is a continuation-in-part of U.S. application Ser. No. 13/083,970, filed on Apr. 11, 2011, which is incorporated by reference in its entirety.

BACKGROUND

1. Field of the Disclosure

The present disclosure relates generally to adjustment of focus in an image capturing device.

2. Description of the Related Art

A focal plane of an optical system is a plane that lies perpendicular to the optical axis and that passes through a focal point of the optical system. Rays of light that enter the optical system and that are parallel to the optical axis converge on the focal point. Typically, objects within the same focal plane appear equally sharp and objects out of a focal plane appear blurred relative to the objects in the focal plane. Some image capturing devices can capture images with more than one focal plane, for example by capturing light field images or by capturing multiple images, each with a different focal plane.

SUMMARY

In one embodiment, a method for setting a focal transition for an image capturing device comprises receiving data including user selections of focal settings for respective areas of interest in an image, generating a first interface that includes indicators of the focal settings for the respective areas of interest and indicators of transitional focal settings for respective transitional areas between the areas of interest, receiving data including user selections of the transitional focal settings for the respective transitional areas between the areas of interest, and generating a second interface, the second interface including indicators of the transitional focal settings for the respective transitional areas between the areas of interest.

In one embodiment, a system for setting a focal transition comprises a computer-readable medium, an input interface configured to receive data indicating selections from a user, and one or more processors configured to cause one or more computing devices to generate a first interface indicating focal settings for respective areas of interest in an image, receive data indicating one or more user selections, the one or more user selections indicating focal settings for areas between the areas of interest in the image, and generate a second interface indicating the focal settings for the areas between the areas of interest in the image.

In one embodiment, one or more computer-readable media store instructions that, when executed by one or more computing devices, cause the one or more computing devices to perform operations comprising receiving one or more first user selections, the one or more first user selections indicating transitional focal settings between a first focal setting and a second focal setting, wherein the first focal setting is associated with a first area of an image, the second focal setting is associated with a second area of the image, and the transitional focal settings are associated with a transitional area of the image between the first area and the second area, and generating a first interface indicating the transitional focal settings between the first focal setting and the second focal setting.

In one embodiment, an image processing method comprises receiving a user input indicating first and second areas of interest in a preview image, receiving one or more transition inputs indicating a transition of focal settings between the first area of interest and the second area of interest, determining focal settings over the preview image based on the user input and the transition input, and deriving a parameter to capture an image that conforms to the determined focal settings.

BRIEF DESCRIPTION OF THE DRAWINGS

FIG. 12 illustrates an example of a look-up table.

DETAILED DESCRIPTION

The following disclosure describes certain illustrative embodiments. Additionally, the illustrative embodiments may include several novel features, and a particular feature may not be essential to practice the systems and methods described herein.

Figure 1:
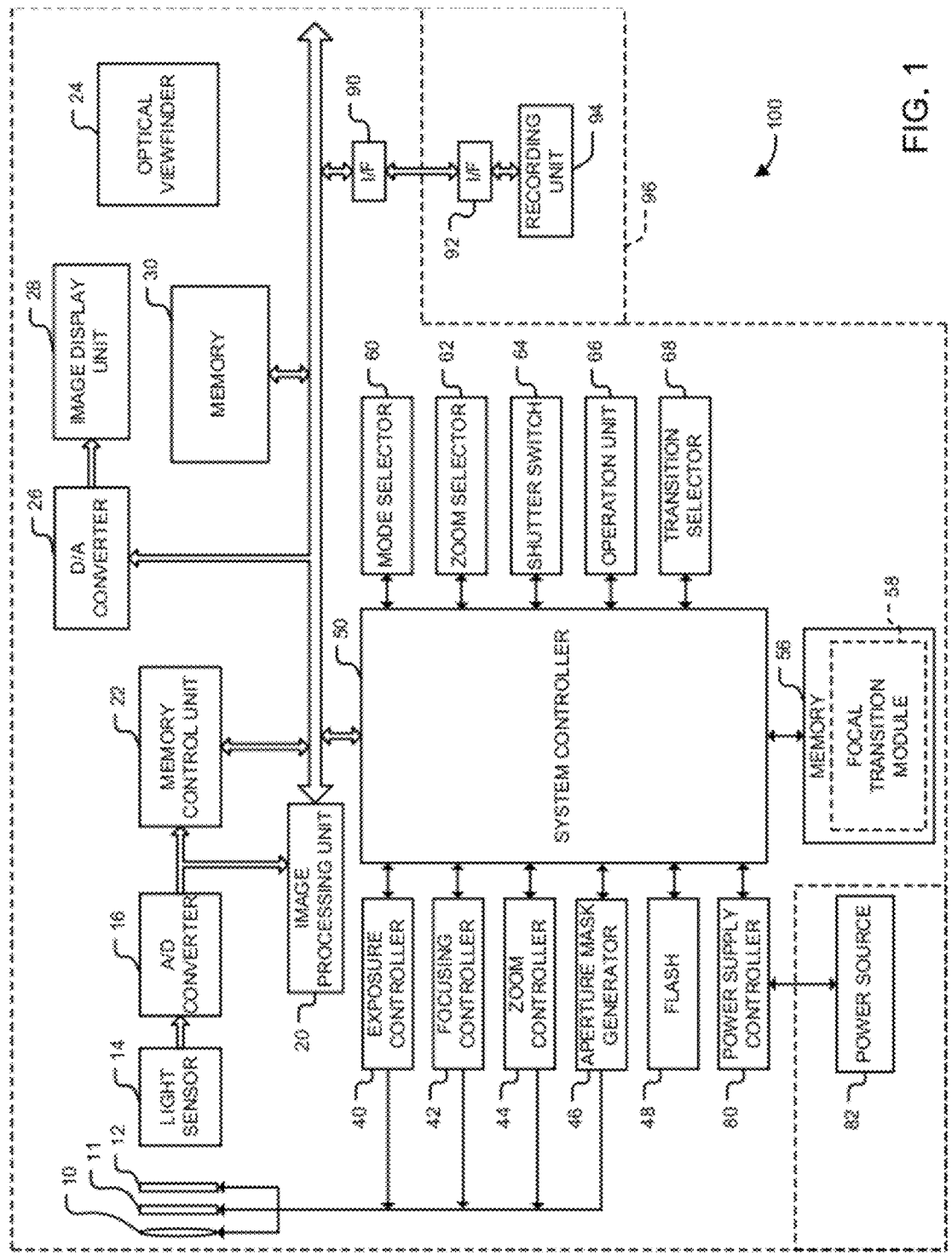
FIG. 1 illustrates an embodiment of a system for adjusting focal transitions in an image.

FIG. 1 illustrates an embodiment of a system 100 for adjusting focal transitions in an image. The system 100 receives an image of a scene and the focal settings for one or more areas of interest (e.g., anchored metering points, the center of gravity of a region of an RGB color, a user indicated area) in the image of the scene. The system 100 also generates an interface that indicates the areas of interest and their respective focal settings, and the system receives selections of transitional focal settings for the transitional areas between the areas of interest and generates an interface that indicates the selections. Thus, the system 100 allows a user to select transitional focal settings for the transitional areas between the areas of interest. The system 100 may also generate image capturing parameters (e.g., an aperture spatial mask, and electronic aperture mask) that configure one or more image capturing devices to implement the focal settings.

For example, an image may indicate two areas of interest that are in focus. The system 100 generates an interface (e.g., generates data that defines a graphical user interface) that indicates the two areas of interest and their respective focal settings, and the system 100 receives selections of focal settings for the transitional area between the areas of interest. The selections may indicate an abrupt transition, a gradual transition, etc., of the focal settings for the transition between the areas of interest. The system 100 also generates adjustments for image capturing parameters (e.g., parameters for one or more lenses, apertures, shutters, light sensors) that implement the selected focal settings. Thus, the focus and/or blurriness of the space between the areas of interest an image can be selected according to user preferences.

The system 100 includes a lens 10 (which may include a plurality of lenses), an aperture 11 (which may include a plurality of apertures, for example a multi-aperture array), a shutter 12, and a light sensor 14 (which may include a plurality of light sensors) that converts incident electromagnetic radiation into electrical signals. Furthermore, in other embodiments the lens 10, the aperture 11, and the shutter 12 may be arranged differently than is shown in the embodiment of FIG. 1, and the system 100 may include a plenoptic system and/or a polydipotric system.

Electromagnetic radiation (also referred to herein as "light") reflected from a scene (e.g., an object in the scene) passes through the lens 10, the aperture 11, and the shutter 12 (when open) to the light sensor 14 and may form an optical image on a light sensing surface of the light sensor 14. The light sensor 14 converts the light to analog image signals and outputs the signals to an ND converter 16. The A/D converter 16 converts the analog image signals to digital image signals. The light sensor 14 can detect light in the spectrum visible to the human eye and/or in the spectrum that the human eye cannot detect (e.g., infrared, x-ray, ultraviolet, gamma rays). In some embodiments, the light sensor 14 can detect light fields, for example four-dimensional light fields.

The system 100 also includes an image processing unit 20 (a unit may be implemented in hardware (e.g., circuitry), software (e.g., a module), or a combination of hardware and software), which applies resize processing, such as predetermined interpolation and reduction, and color conversion processing to data from the ND converter 16 or data from a memory 30. The image processing unit 20 performs predetermined arithmetic operations using the captured image data, and the system 100 performs exposure control and ranging control based on the obtained arithmetic result. The system 100 can perform TTL (through-the-lens) AF (auto focus) processing, AE (auto exposure) processing, and EF (flash pre-emission) processing. The image processing unit 20 further performs TTL AWB (auto white balance) operations based on the obtained arithmetic result.

Output data from the ND converter 16 is written in the memory 30 via the image processing unit 20 and/or memory control unit 22. The memory 30 stores image data that is captured by the light sensor 14 and converted into digital data by the ND converter 16. The memory 30 may store images (e.g., still photos, videos) and other data, for example metadata and file headers for captured images. The memory 30 may also serve as an image display memory. A D/A converter 26 converts digital data into an analog signal and supplies that analog signal to an image display unit 28. The image display unit 28 presents images according to the analog signal from the D/A converter 26 on a display (e.g., an LCD, an LED display, an OLED display, a plasma display, a CRT display). The system 100 also includes an optical viewfinder 24 that presents at least part of the view detected by the light sensor 14.

An exposure controller 40 controls the shutter 12 and controls the size of the aperture(s) 11. The exposure controller 40 may also have a flash exposure compensation function that links with a flash 48 (e.g., a flash emission device). A focusing controller 42 controls the size of the aperture 11 and/or the position of the lens 10, and a zoom controller 44 controls the angle of view of the lens 10. The exposure controller 40, focusing controller 42, and zoom controller 44 may each partially control the lens 10, aperture 11, and shutter 12, and may also collaborate to calculate parameters for the lens 10, aperture 11, and shutter 12.

The aperture mask generator 46 generates masks that define aperture settings for respective apertures in an array of apertures. Additionally, the light sensor 14 may include super-pixels that each include a group of pixels. Each pixel in the group may be able to be independently associated with an aperture in a multi-aperture array (e.g., one pixel to one aperture, many to pixels to one aperture). The group of pixels may include various numbers of pixels (e.g., 2, 4, 8, 16), however, resolution may decrease as the number of pixels in the group increases. Thus, since light that passes through different apertures may be detected by at least one pixel in a group, a super-pixel may detect rays of light that each passes through a different aperture.

A memory 56 (as well as the memory 30) includes one or more computer readable and/or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EEPROM, etc. The memory 56 may store computer-executable instructions and data for the operation of a system controller 50. The system controller 50 includes one or more processors (e.g., microprocessors) and reads and performs computer-executable instructions, such as instructions stored in the memory 56. Note that the computer-executable instructions may include those for the performance of various methods described herein. The memory 56 is an example of a non-transitory computer-readable medium that stores computer-executable instructions.

The memory 56 includes a focal transition module 58. A module includes computer-readable instructions that may be executed by one or more members of the system 100 to cause the system 100 to perform certain operations, though for purposes of description a module may be described as performing the operations. Modules may be implemented in software (e.g., JAVA, C, C++, C#, Basic, Assembly), firmware, and/or hardware. In other embodiments, the system 100 may include additional modules and/or the module may be divided into more modules. The instructions in the focal transition module 58 may be executed to cause the system 100 to set focal transitions, to adjust focal transitions, and to generate interfaces that indicate focal transitions and/or perform the methods described herein. Modules may be implemented in any applicable computer-readable medium that can be employed as a medium for supplying the computer-executable instructions. Furthermore, when the computer-executable instructions are executed, an operating system executing on the system 100 may perform at least part of the operations that implement the instructions.

The system 100 also includes a mode selector 60 that sets the operation mode of the system 100 to still image recording mode, video recording mode, playback mode, etc. A shutter switch 64 may be activated in the middle of operation (half stroke) and generate a first shutter switch signal. Also, the shutter switch 64 may be activated upon a full stroke and generate a second shutter switch signal. The system controller 50 may start one or more operations (e.g., AF processing, AE processing, AWB processing, EF processing) in response to the first shutter switch signal. Also, in response to the second shutter switch signal, the system controller 50 may perform and/or initiate one or more operations, including the following: reading image signals from the light sensor 14, converting image signals into image data by the ND converter 16, processing of image data by the image processor 20, writing image data to the memory 30, reading image data from the memory 30, compression of the image data, and writing data to the recording medium 96.

A zoom selector 62 is operable by a user to change the angle of view (zooming magnification or shooting magnification). The zoom selector 62 may include, for example, a slide-type member, a lever, switch, a wheel, a knob, and/or a switch.

The operation unit 66 may include various buttons, touch panels and so on. In one embodiment, the operation unit 66 includes one or more of a menu button, a set button, a macro selection button, a multi-image reproduction/repaging button, a single-shot/serial shot/self-timer selection button, a forward (+) menu selection button, and a backward (−) menu selection button. The operation unit 66 may also set and change the flash operation mode. The settable modes include, for example, auto, flash-on, red-eye reduction auto, and flash-on (red-eye reduction). The operation unit 66 may be used to select a storage format for the captured image information, including JPEG (Joint Photographic Expert Group) and RAW formats. The operation unit 66 may set the system 100 to a plural-image shooting mode, wherein a plurality of images is captured in response to a single shooting instruction (e.g., a signal from the shutter switch 64). This may include auto bracketing, wherein one or more image capturing parameters (e.g., white balance, exposure, aperture settings) are altered in each of the images.

A power supply controller 80 detects the existence/absence of a power source, the type of the power source, and a remaining battery power level, and supplies a necessary voltage and current to other components as required. A power source 82 includes a battery, such as an alkaline battery, a lithium battery, a NiCd battery, a NiMH battery, and an Li battery, an AC adapter, a DC adapter, etc.

The recording media 96 includes a recording unit 94 that is includes one or more computer-readable and/or computer-writable media. The system 100 and the recording media 96 communicate via an interface 90 of the system 100 and an interface 92 of the recording media. Although the illustrated embodiment of the system 100 includes one pair of interfaces 90, 92 and one recording media 96, other embodiments may include additional recording media and interfaces.

The system 100 also includes a transition selector 68 that sets and/or adjusts focal transitions between areas of interest. The transition selector 68 may include, for example, one or more buttons, touch screens, dials, joysticks, wheels, levers, cameras, microphones, etc. For example, a user may touch a point on a touch screen that corresponds to a focal setting for a respective transitional area or a user may operate a joystick up, down, left, and/or right to select a transitional area and adjust the respective focal setting based on an interface that indicates the area(s) of interest, the transitional area(s), and/or the respective focal settings. The selector may also receive selections via other inputs, including, for example, voice command(s), eye gazing, eye movement, multi-touch, etc.

Figure 2:
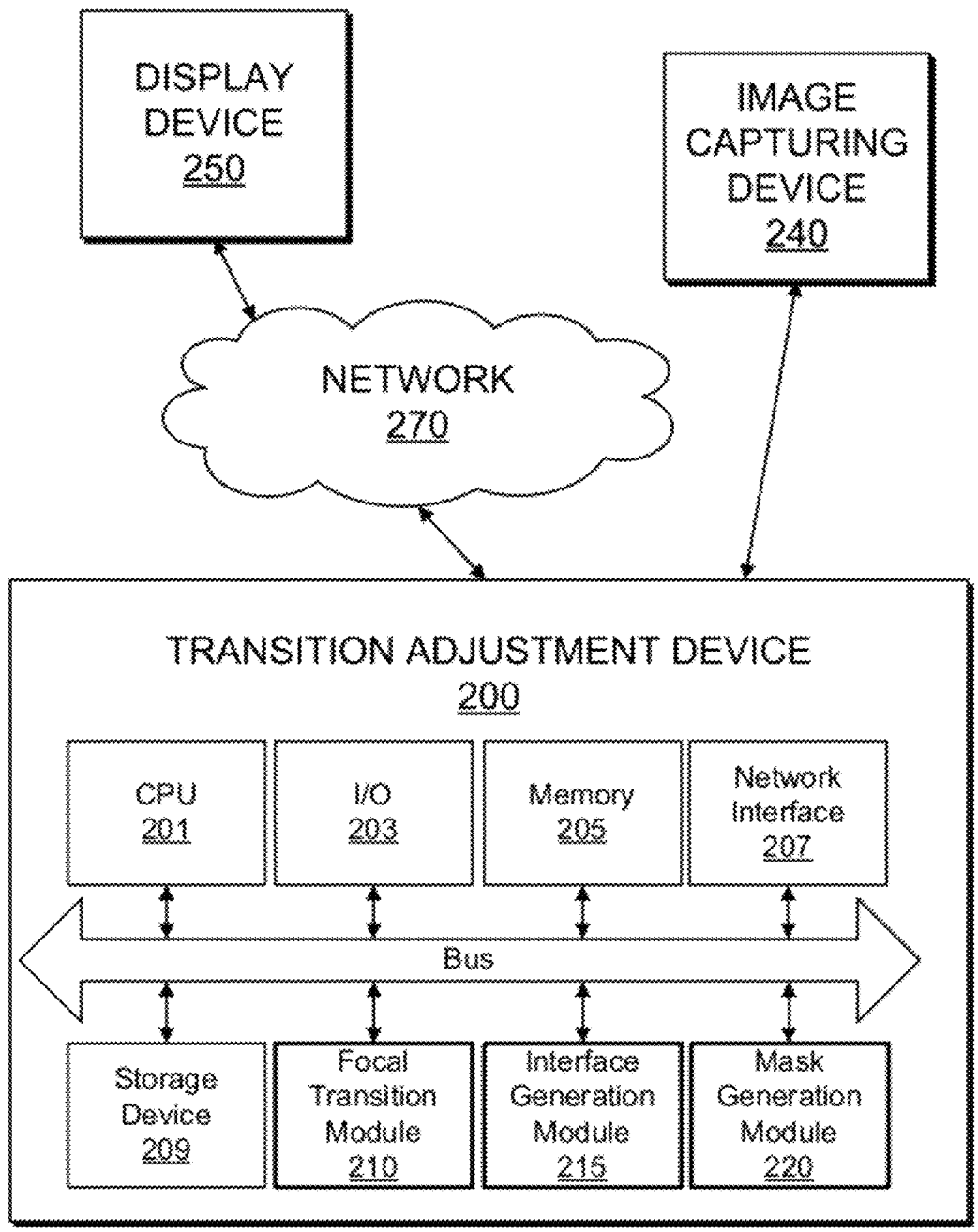
FIG. 2 illustrates an embodiment of a transition adjustment device.

FIG. 2 illustrates an embodiment of a transition adjustment device 200. The transition adjustment device 200 communicates with a display device 250 and an image capturing device 240. In the embodiment shown, the transition adjustment device 200 communicates with the display device 250 via a network 270. The network 270 may include one network or any combination of networks, including the Internet, WANs, PANs, HANs, MANs, and LANs, as well as any combination of wired or wireless networks. The transition adjustment device 200 communicates with the image capturing device 240 via a direct connection (e.g., serial port, USB, IEEE 1394, Ethernet, HDMI), though in other embodiments the transition adjustment device 200, the display device 250, and the image capturing device 240 may communicate via different configurations than is illustrated in FIG. 2 (e.g., all communicate via direct connections, all communicate via one or more networks). The display device 250 is configured to render images and/or interfaces on a display (e.g., a plasma display, LED display, OLED display, CRT display, DLP display, LCD, a projector). The image capturing device 240 is configured to capture images of a scene (e.g., an RGB camera (standalone, cell phone, etc.), a computational camera).

The transition adjustment device 200 includes one or more processors 201 (also referred to herein as "CPU 201"), which may be conventional or customized central processing units (e.g., microprocessor(s)). The CPU 201 is configured to read and execute computer readable instructions, and the CPU 201 may command/and or control other components of the transition adjustment device 200. The transition adjustment device 200 also includes I/O interfaces 203, which provide communication interfaces to input and output devices, including a keyboard, a display (e.g., the display device 250), a mouse, a printing device, a touch screen, a light pen, an optical storage device, a scanner, a microphone, a camera, a drive, etc.

The transition adjustment device 200 additionally includes a memory 205, which includes one or more computer-readable and/or writable media. The network interface 207 allows the transition adjustment device 200 to communicate with the network 270 and other devices via the network 270, and the network interface 207 may have wired and/or wireless capabilities. The storage device 209 stores data, computer-executable instructions, and/or modules and may include, for example, a magnetic storage device (e.g., a hard drive), an optical storage device, and/or a solid state drive. The components of the transition adjustment device 200 are connected via a bus. Also, the transition adjustment device 200 includes an operating system, which manages one or more of the hardware, the processes, the interrupts, the memory, and the file system.

The transition adjustment device 200 also includes a focal transition module 210, an interface generation module 215, and a mask generation module. The focal transition module 210 determines one or more focal settings for one or more areas (e.g., areas of interest, transitional areas) in an image and receives user selections of focal settings (e.g., via the I/O interface 203) for respective areas in the image.

The interface generation module 215 generates an interface that indicates areas (e.g., areas of interest, transitional areas) in an image and their respective focal settings. The interface generation module 215 may also allow a user to configure the interface, for example by selecting one or more settings that will be included in the interface, the format of the interface, etc. For example, the interface generation module 215 may let a user select an interface to show aperture settings, a three-dimensional representation of the focal settings for the image, a two dimensional representation of the focal settings for the image, etc. The interface generation module 215 may also generate a preview of the image that shows the image with the selected focal settings applied to the image. The interface may then be transmitted to the display device 250 for display.

The mask generation module 220 generates aperture parameters masks and/or electronic aperture masks based on the focal settings, such as masks that implement the focal settings. An electronic aperture may indicate which aperture is selected for each super-pixel in a system that includes super-pixels and multi-aperture arrays. An aperture parameter mask is a spatial mask that indicates which is the aperture for each region or pixel of the image. It could be encoded as f-stop (such as 3.5, 4, 4.5, 5, 5.6, 6.3, 7.1, 8, 9, 10, 11, 13, 14, 16, 18, 20, 22) or any other numerical parameter that can be related to an f-number. The aperture parameter mask then could be correlated to the electronic aperture mask that indicates which pixel in each super-pixel is selected for each super-pixel in the image. The mask generation module 220, interface generation module 215, and/or the focal transition module 210 may be configured with the capabilities of the image capturing device 240 (e.g., an aperture array) and not allow selection of focal settings that are not within the capabilities of the image capturing device.

Figure 3:
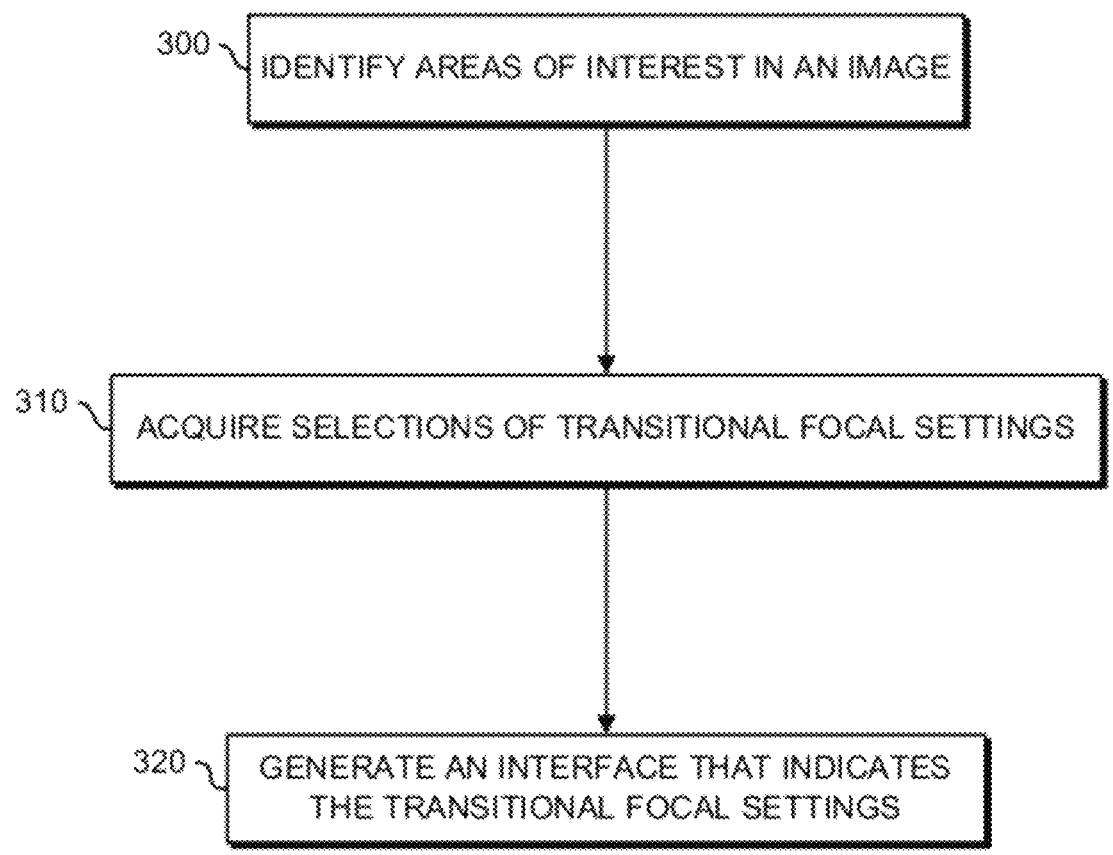
FIG. 3 is a block diagram that illustrates an embodiment of a method for adjusting focal transitions.

FIG. 3 is a block diagram that illustrates an embodiment of a method for adjusting focal transitions. Other embodiments of this method and the other methods described herein may omit blocks, may add blocks, may change the order of the blocks, may combine blocks, and/or may divide blocks into separate blocks. Additionally, one or more components of the systems and devices described herein may implement the method shown in FIG. 3 and the other methods described herein.

In block 300, areas of interest in an image are identified. The areas of interest may be identified by a user (e.g., by user selection) or by a device (e.g., a computing device). In block 310, selections of transitional focal settings are acquired, for example from a user via an input device. The selections of transitional focal settings may include the selections of focal settings for a discrete number of points in the transitional area, the selection of the shape of a line that corresponds to focal settings, etc. In block 320 an interface is generated that indicates the transitional focal settings. Examples of interfaces are illustrated in FIG. 5-FIG. 9.

Figure 4:
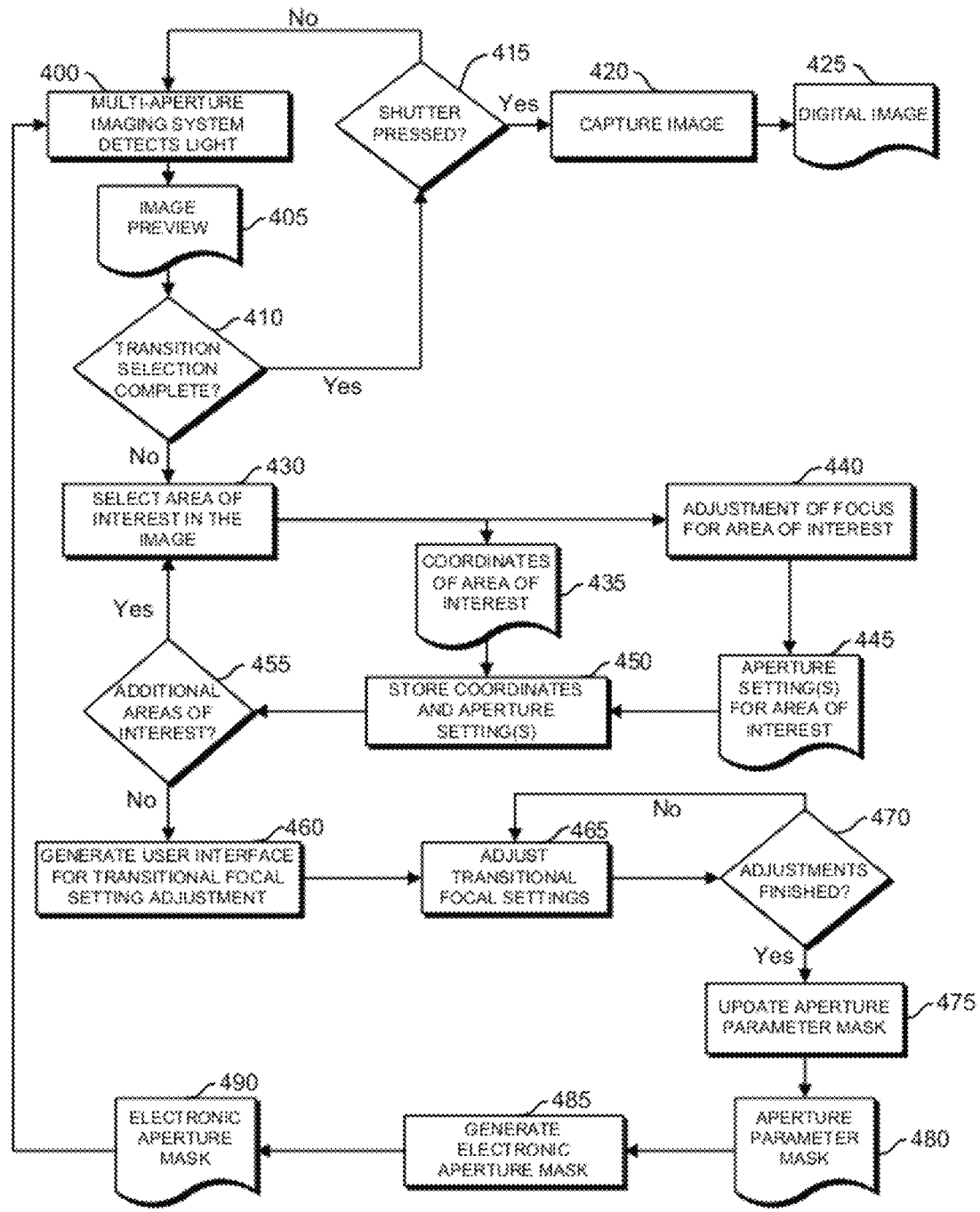
FIG. 4 is a block diagram that illustrates an embodiment of a method for adjusting focal transitions.

FIG. 4 is a block diagram that illustrates an embodiment of a method for adjusting focal transitions. In block 400, a multi-aperture imaging system detects light and generates an image preview 405 of a scene. In block 410, there is a determination if the transition selection is complete. If the transition selection is complete, flow proceeds to block 415 where it is determined if the shutter is pressed. If the shutter is pressed, flow proceeds to block 420 and a digital image 425 is captured that implements the selected transitions (e.g., an image that is captured by an image capturing device configured to the selected transitions). If the shutter is not pressed in block 415 (e.g., after a predetermined period of time), the method may return to block 400.

If in block 410 it is determined that the transition selection is not complete, the flow proceeds to block 430, where an area of interest in the image is selected, for example by a user or by a computing device, and the coordinates of the area of interest 435 are determined. In block 440 any adjustment of focus of the area of interest is determined, for example by a user (who may indicate the adjustment via one or more controls and/or interfaces) or by a computing device, and the aperture setting(s) for the area of interest 445 is generated. Next, in block 450, the coordinates of the area of interest and the aperture setting(s) are stored, for example in a computer readable medium. Moving to block 455, it is determined if there are any additional areas of interest in the image. If there are any additional areas of interest, the flow returns to block 430, where an area of interest is selected. If there are not any additional areas of interest, the flow proceeds to block 460.

In block 460, a user interface (e.g., a graphical user interface) for transitional focal setting adjustment is generated. The user interface may include indicators of the areas of interest, the transitional areas, and/or their respective focal settings and may be modified to show changes to the focal settings and/or areas of interest. Moving to block 465, one or more transitional focal settings are adjusted, for example by receiving user selections of transitional focal settings via the user interface. Next, in block 470, it is determined if the adjustments are finished. If the adjustments are not finished, flow returns to block 465. If the adjustments are finished, flow proceeds to block 475, where an aperture parameter mask 480 is updated (or generated, depending on the embodiment) that indicates the settings for respective apertures and/or one or more other settings (e.g., zoom settings, shutter settings), and in block 485 an electronic aperture mask 490 is generated based on the aperture parameter mask 480. Flow then returns to block 400, where the electronic aperture mask 490 is used by the multi-aperture imaging system to detect light. In some embodiments, aperture settings for different image capturing operations are generated, for example for an image capturing device that has a single aperture and that captures images with sequential image capturing operations that have different respective aperture settings. Furthermore, the image preview 405 may be generated to provide immediate feedback regarding changes made to any areas of interest and focal settings for the areas of interest and transitional areas.

Figure 5A:
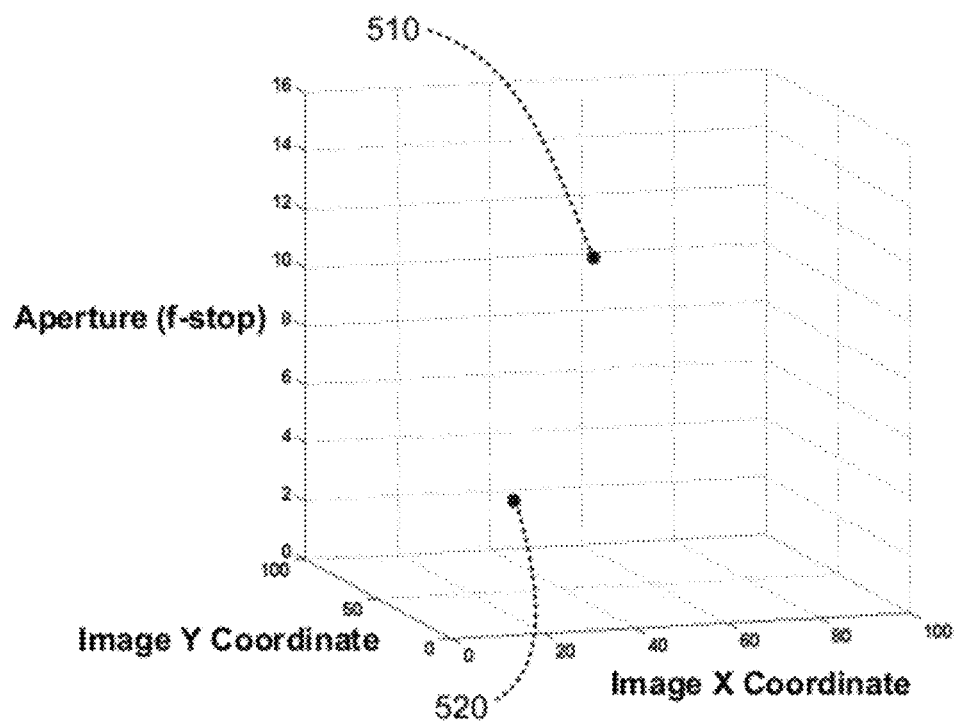
FIGS. 5A and 5B illustrate embodiments of interfaces that indicate areas of interest.
Figure 5B:
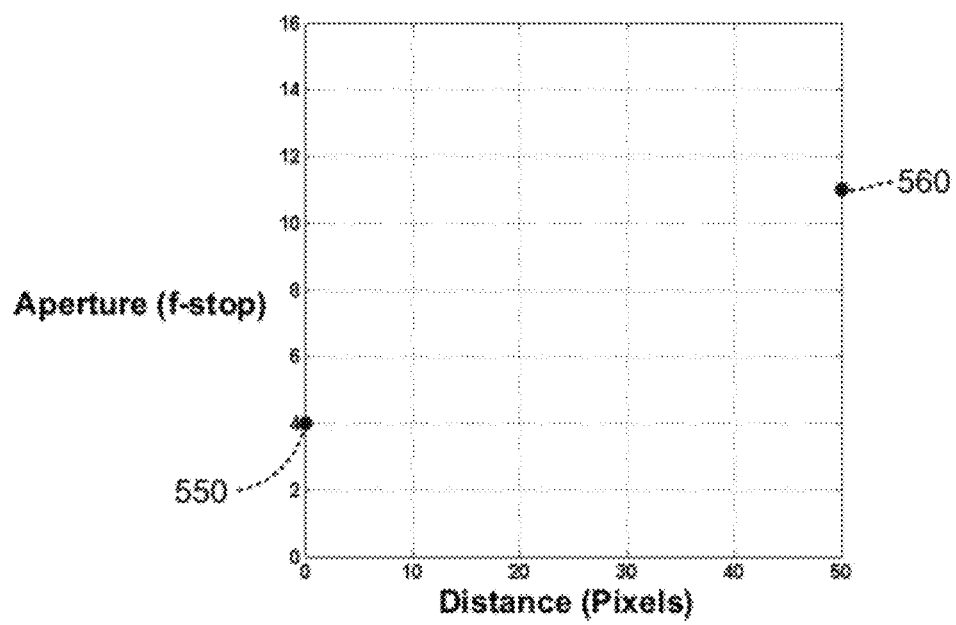

FIGS. 5A and 5B illustrate embodiments of interfaces that indicate areas of interest 510, 520. FIG. 5A represents areas of interest 510, 520 and their respective aperture settings as approximate points in a three-dimensional coordinate space, where the X and Y axes indicate position in the image, and the Z axis indicates an aperture setting (or another setting, for example sharpness or blurriness). In this example, an area of interest 510 is located in the coordinate space at approximately 40, 50, 11 and is associated with an aperture setting of f-stop 11, and an area of interest 520 is located in the coordinate space at approximately at 20, 0, 4 and is associated with an aperture setting of f-stop 4. Areas of interest may also be represented with other indicia, for example two or three dimensional shapes, icons, colors, characters, numerals, etc.

FIG. 5B represents areas of interest 550, 560 and their respective aperture settings as approximate points in a two-dimensional coordinate space, where the X-axis indicates a distance in pixels between the areas of interest, and the Y axis indicates an aperture setting. An area of interest 550 is located in the coordinate space at approximately 0, 4 and is associated with an aperture setting of f-stop 4, and an area of interest 560 is located in the coordinate space at approximately 50, 11 and is associated with an aperture setting of f-stop 11.

Figure 6A:
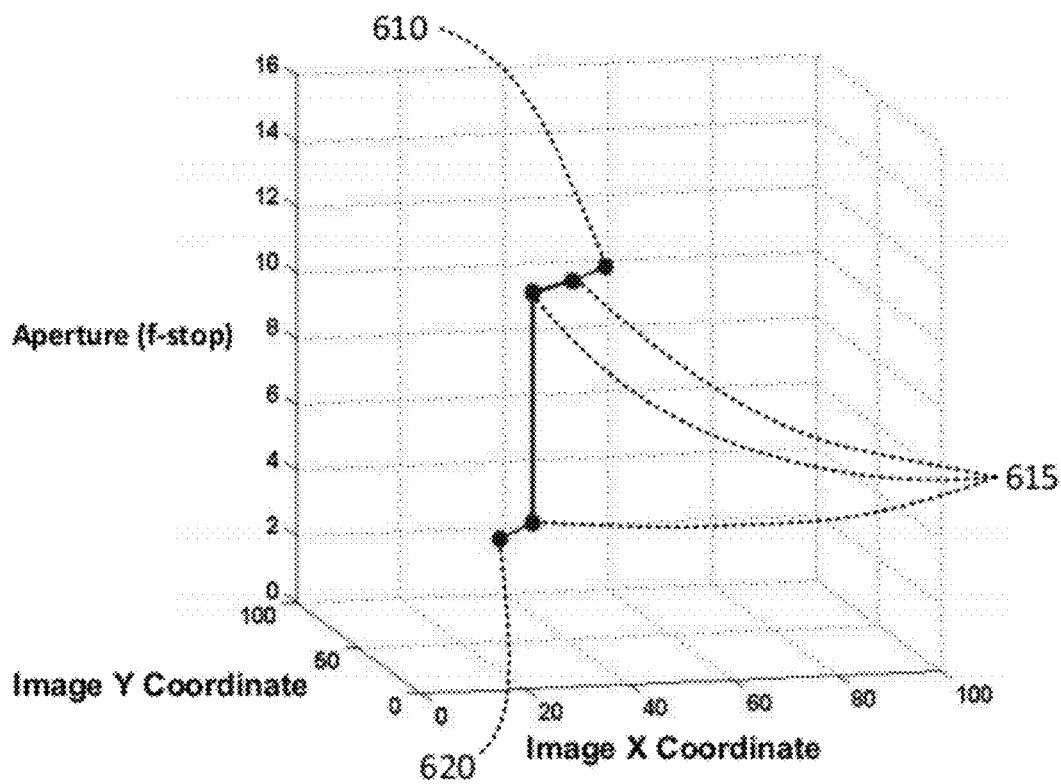
FIGS. 6A and 6B illustrate embodiments of interfaces that indicate focal transitions between areas of interest.
Figure 6B:
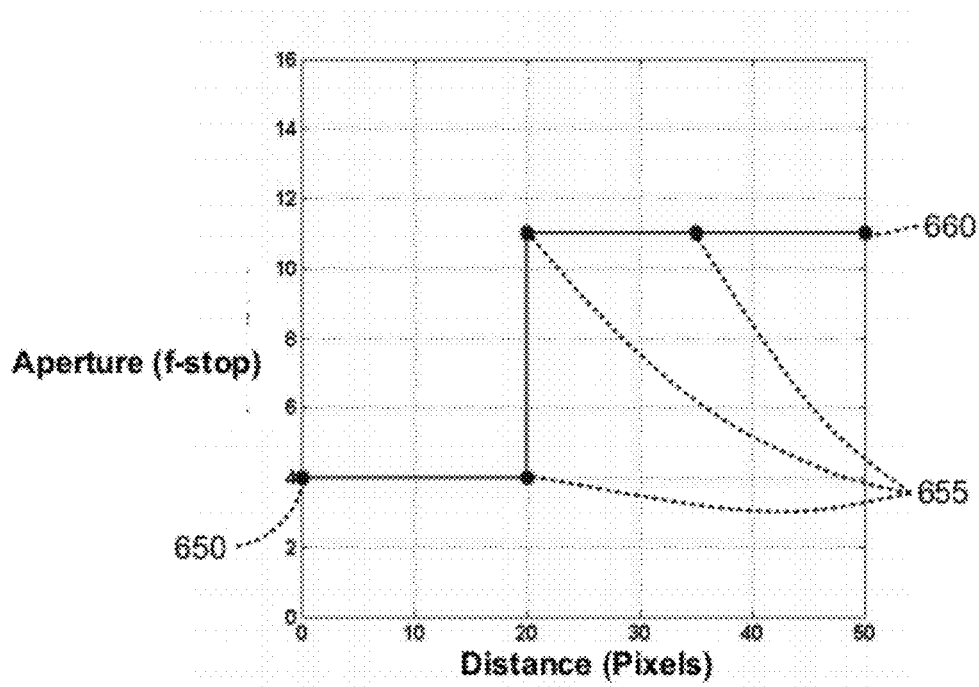

FIGS. 6A and 6B illustrate embodiments of interfaces that indicate focal transitions between areas of interest. FIG. 6A represents areas of interest 610, 620 and their respective aperture settings as approximate points in a three-dimensional coordinate space, where the X and Y axes indicate position in the image, and the Z axis indicates an aperture setting. FIG. 6A also illustrates transitional aperture settings 615 that indicate aperture settings for the transitional area between the areas of interest 610, 620. In the example shown in FIG. 6A, the transitional aperture settings 615 indicate a relatively abrupt change in the aperture setting between f-stop 11 and f-stop 4 in the transitional area. Though the embodiment of FIG. 6A illustrates the transitional aperture settings 615 as points joined by a line, in other embodiments the transitional aperture settings may be represented by other indicia, including one or more lines, surfaces, shapes, icons shadings, discrete points, etc. For example, if there are three or more areas of interest and they are represented in a three dimensional coordinate space, a surface may be used to indicate the focal settings for the transitional areas.

FIG. 6B represents areas of interest 650, 660 and their respective aperture settings as approximate points in a two-dimensional coordinate space, where the X-axis indicates a distance in pixels between the areas of interest, and the Y axis indicates an aperture setting. FIG. 6B also illustrates transitional aperture settings 655 for the transitional area between the areas of interest 650, 660. In the example shown in FIG. 6B, the transitional aperture settings 615 indicate a relatively abrupt change in the aperture setting between f-stop 4 and f-stop 11 at about X=20 in the transitional area. Though FIGS. 6A and 6B show aperture settings and relatively abrupt transitions, other embodiments may show different settings and/or transitions.

Figure 7A:
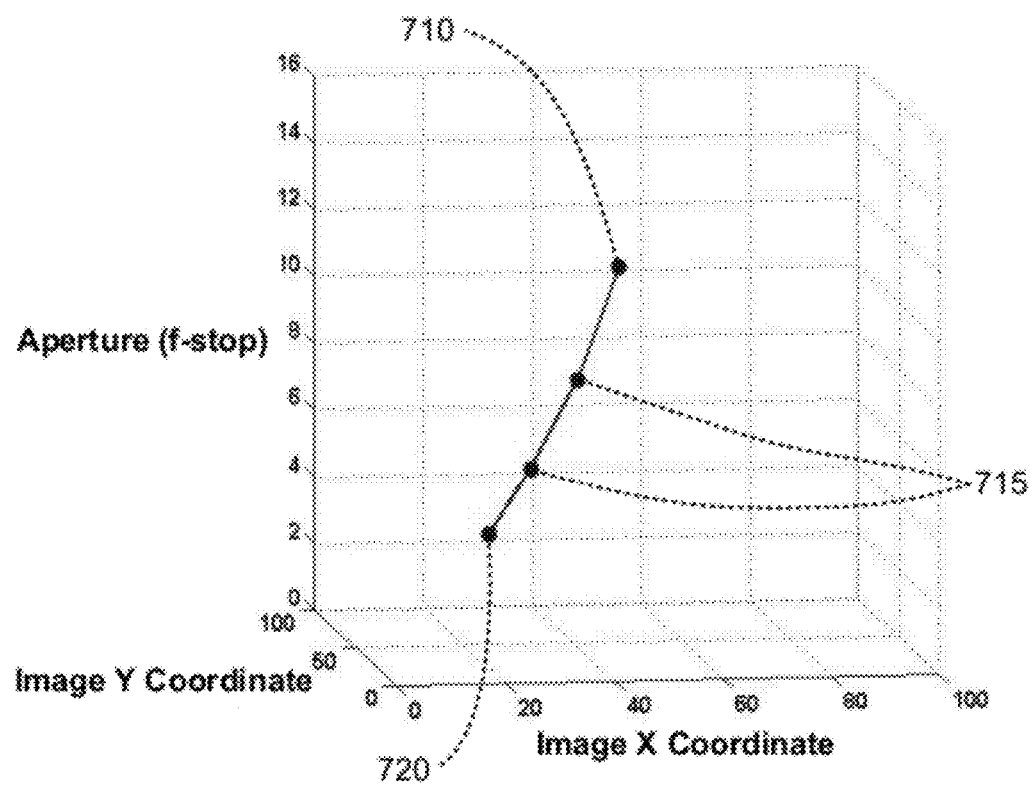
FIGS. 7A and 7B illustrate embodiments of interfaces that indicate focal transitions between areas of interest.
Figure 7B:
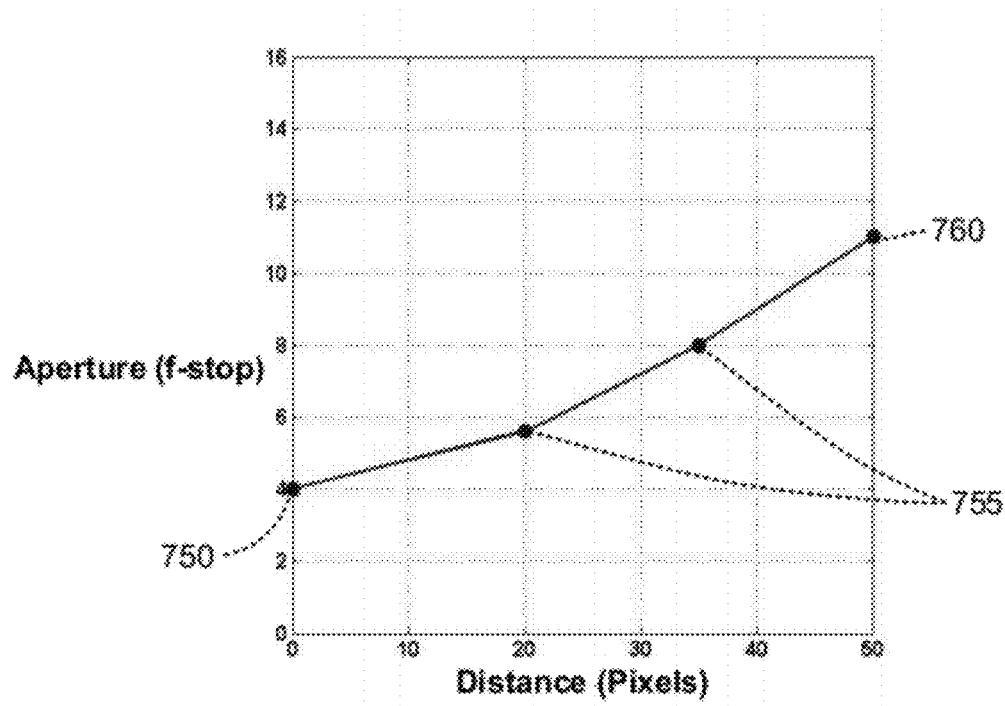

FIGS. 7A and 7B illustrate embodiments of interfaces that indicate focal transitions between areas of interest. In the example shown in FIG. 7A, the transitional aperture settings 715 indicate a relatively gradual change in the aperture settings between f-stop 11 and f-stop 4 in the transitional area. Similarly, in the example shown in FIG. 7B the transitional aperture settings 755 indicate a relatively gradual change between f-stop 4 and f-stop 11 in the transitional area. For example, at X=20 the aperture setting is approximately 5.8, and at X=35 the aperture setting is approximately 8.

Figure 8A:
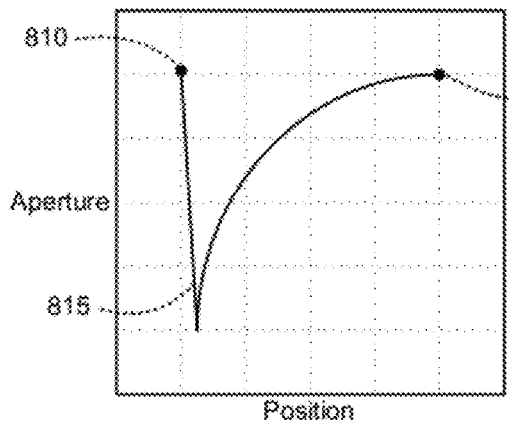
FIGS. 8A, 8B, 8C, and 8D illustrate embodiments of interfaces that indicate focal transitions between areas of interest.
Figure 8B:
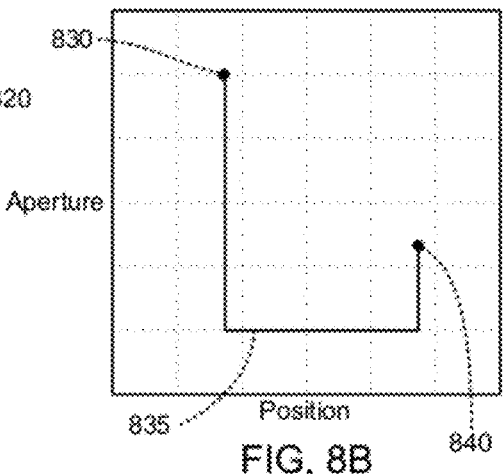
Figure 8C:
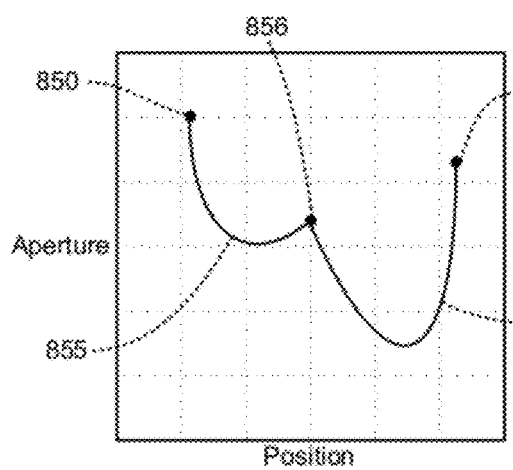
Figure 8D:
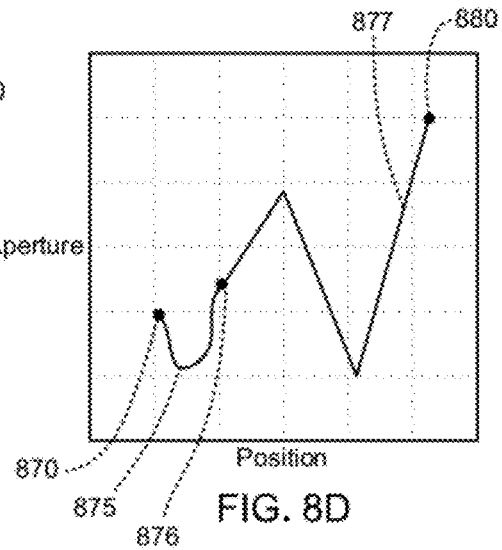

FIGS. 8A, 8B, 8C, and 8D illustrate embodiments of interfaces that indicate focal transitions between areas of interest. FIGS. 8A, 8B, 8C, and 8D include two-dimensional coordinate space representations of areas of interest, transitional areas, and their respective focal settings, where the X-axis shows positions in the image and the Y-axis shows aperture settings. FIG. 8A includes areas of interest 810 and 820 and transitional aperture settings 815 between the areas of interest 810 and 820. The transitional aperture settings 815 illustrate a relatively abrupt change in aperture settings for part of the transitional area and a gradual change in aperture settings for part of the transitional area. FIG. 8B includes areas of interest 830 and 840 and transitional aperture settings 835, which show a relatively abrupt aperture settings transition between the areas of interest and the transitional area. FIG. 8C includes areas of interest 850, 856, and 860 and transitional aperture settings 855 and 857, which show relatively gradual and asymmetric transitions between the areas of interest 850, 856, and 860. FIG. 8D includes areas of interest 870, 876, and 880 and transitional aperture settings 875 and 877, which show other embodiments of focal transitions. The embodiments of areas of interest, transitional areas, and respective focal settings shown in the preceding FIGS. 5-8 are presented as examples, and the systems and methods described herein may be used to indicate and select other focal settings for areas of interest and/or transitional areas and also to capture images that implement the focal settings.

Figure 9:
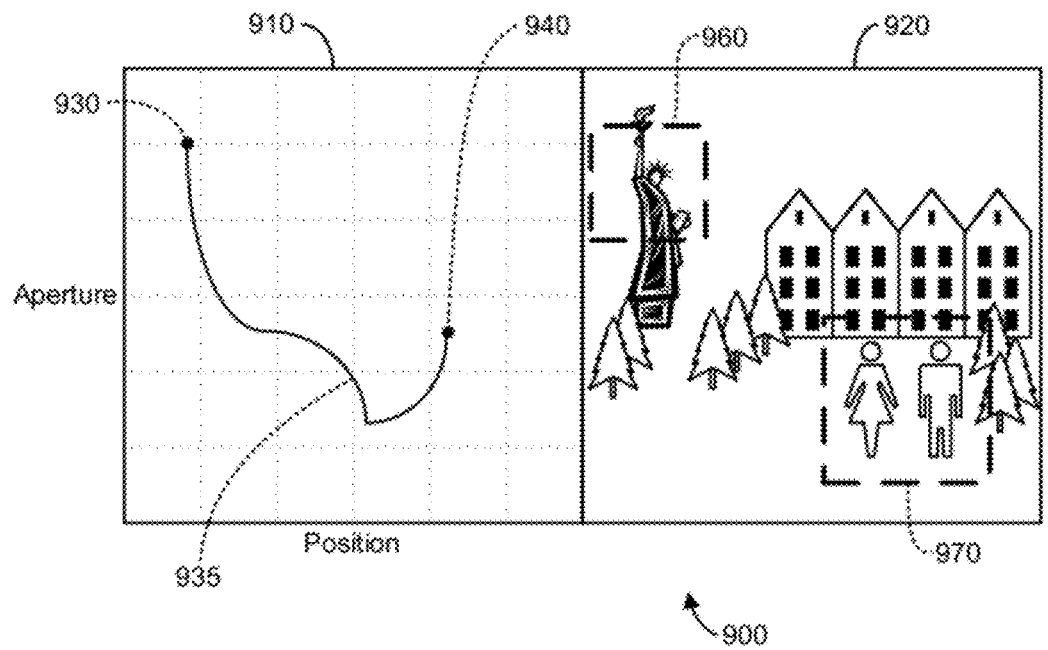
FIG. 9 illustrates an example of an embodiment of an interface that indicates focal transitions between areas of interest.

FIG. 9 illustrates an example of an embodiment of an interface 900 that indicates focal transitions between areas of interest. The interface 900 includes a first portion 910 that indicates aperture settings for areas of interest 930 and 940 and aperture settings for a transitional area 935. The interface 900 also includes a second portion 920 that displays a preview of an image and that indicates the areas of interest 960 and 970 in the image. In this embodiment, area of interest 930 in the first portion 910 corresponds to area of interest 960 in the second portion 920, and area of interest 940 in the first portion 910 corresponds to area of interest 970 in the second portion 920. A user may select one or more areas of interest in the image, for example by touching a touch screen that displays the interface 900 at a location in the second portion 920 that corresponds to an area of interest, and the second portion 920 may be modified to indicate the selection. Also, a user may select the focal settings (e.g., aperture settings, sharpness) for the areas of interest 930, 940 and for the transitional area 935 (e.g., by touching a touch screen that displays the interface 900 at a location in the first portion 910 that corresponds to the desired setting). Additionally, the first portion 910 may be modified as selections of focal settings are received to show changes in focal settings in response to received input. Furthermore, the preview of the image in the second portion 920 may be modified as selections are received to present a view of the image that implements the focal settings that are indicated in the first portion 910.

Figure 10:
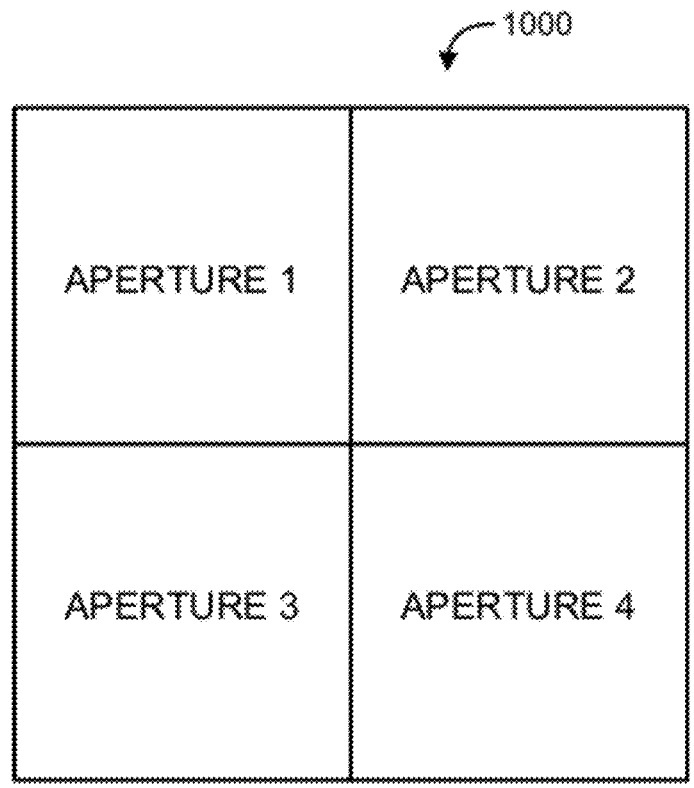
FIG. 10 illustrates an example of an embodiment of a super-pixel.

FIG. 10 illustrates an example of an embodiment of a super-pixel 1000. In this embodiment, the super-pixel 1000 includes four pixels, each of which may be associated with a different aperture (e.g., an aperture in an array of apertures, each of which may be configured based on a spatial aperture mask), and light may pass through a respective aperture to the associated pixel in the super-pixel 1000. Thus, even where any particular ray of light passes through one aperture, the super-pixel 1000 can detect light that passes through four different apertures. An aperture mask (e.g., electronic aperture mask) may be used to select a pixel in the super-pixel 1000 whose value is to be detected, and the value for the selected pixel may also be used to interpolate values for the other pixels in the super-pixel 1000. Thus, since an aperture mask may indicate which pixel in a super-pixel is selected and each pixel may be associated with an aperture, the aperture mask may indicate which aperture is selected for each super-pixel 1000.

Figure 11:
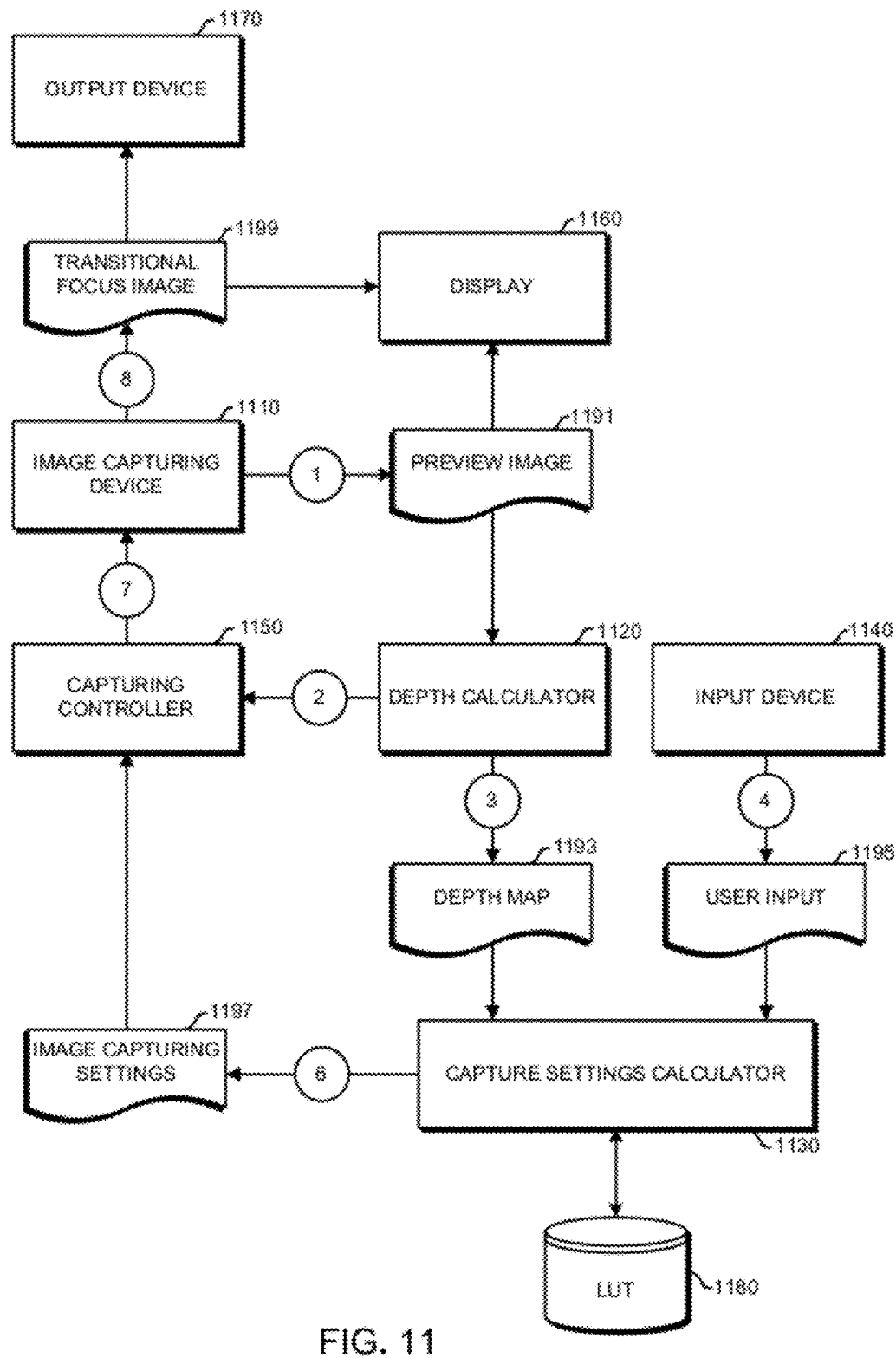
FIG. 11 is a flow diagram which illustrates an embodiment of an image processing system for adjusting focal transitions in an image.

FIG. 11 is a flow diagram which illustrates an embodiment of an image processing system for adjusting focal transitions in an image. In the system, in stage 1 an image capturing device 1110 captures a preview image 1191 of a scene. The image capturing device 1110 may include one or more of a multi-aperture device, a multi-lens device, and a stereo imaging device, and may capture a preview image 1191 that includes depth information. Additionally, the image capturing device 1110 may include one or more liquid lenses (e.g., a variable focus liquid lens produced by VARIOPTIC®) or other reconfigurable lenses. The preview image 1191 is sent to a display 1160, which renders the preview image 1191 for viewing, and to a depth calculator 1120.

In some embodiments, in stage 2 the depth calculator 1120 sends updated settings to a capturing controller 1150 to facilitate the calculation of depth information. For example, the updated settings may be aperture adjustments for one or more apertures, and, as the image capturing device 1110 reconfigures to the updated settings and generates an updated preview image, the differences between the updated preview image and the original preview image can be used to calculate depth in the image. In stage 3, the depth calculator 1120 generates a depth map 1193, which is sent to a capture settings calculator 1130.

In stage 4, an input device 1140 (e.g., touchscreen, keyboard, buttons) receives user input 1195 that indicates one or more areas of interest and desired sharpness settings for an image. The sharpness settings may include respective sharpness settings for the areas of interest and sharpness settings for the portions of the image that are not in an area of interest (e.g., transitional sharpness settings). The user input 1195 is sent to capture settings calculator 1130.

In stage 6, the capture settings calculator 1130 generates the image capturing settings 1197 for the image capturing device 1110 based on the depth map 1193, the user input 1195, and the capabilities of the image capturing device 1110. The capture settings calculator 1130 may reference a look-up table ("LUT") 1180 to determine the image capturing settings 1197. The LUT 1180 maps depth and sharpness to image capturing device settings. FIG. 12 illustrates an example of an LUT 1180. The LUT in FIG. 12 defines an optical aperture for a respective distance and sharpness setting. Optical aperture or lens aperture is specified as an f-number that is defined as the ratio of focal length of the lens to effective aperture diameter of the lens. The sharpness setting is a value from 0 to 10, where 0 is the least sharp and 10 is the most sharp. For example, for entry 1, the LUT maps a distance of 1 meter and a sharpness setting of 0 to an optical aperture of 1.25. In some embodiments, an optical aperture setting does not correspond to the f-stop of the main diaphragm of an image capturing device, and corresponds to one or more other settings of an image capturing system. For example, the optical aperture may refer to a parameter for a liquid lens, such as curvature of membranes of the liquid lens (which may vary the focal length), or to a set of aperture parameters in a multi aperture array. The image capturing settings 1197 are sent to a capturing controller 1150.

The capturing controller 1150 controls the image capturing device 1110, and, in stage 7, the capturing control unit configures the image capturing device 1110 according to the image capturing settings 1197. In stage 8, the image capturing device 1110 captures a transitional focus image 1199, which is sent to the display 1160 and/or an output device 1170 (e.g., an output interface, for example, a hardware drive port, a network port).

Figure 13:
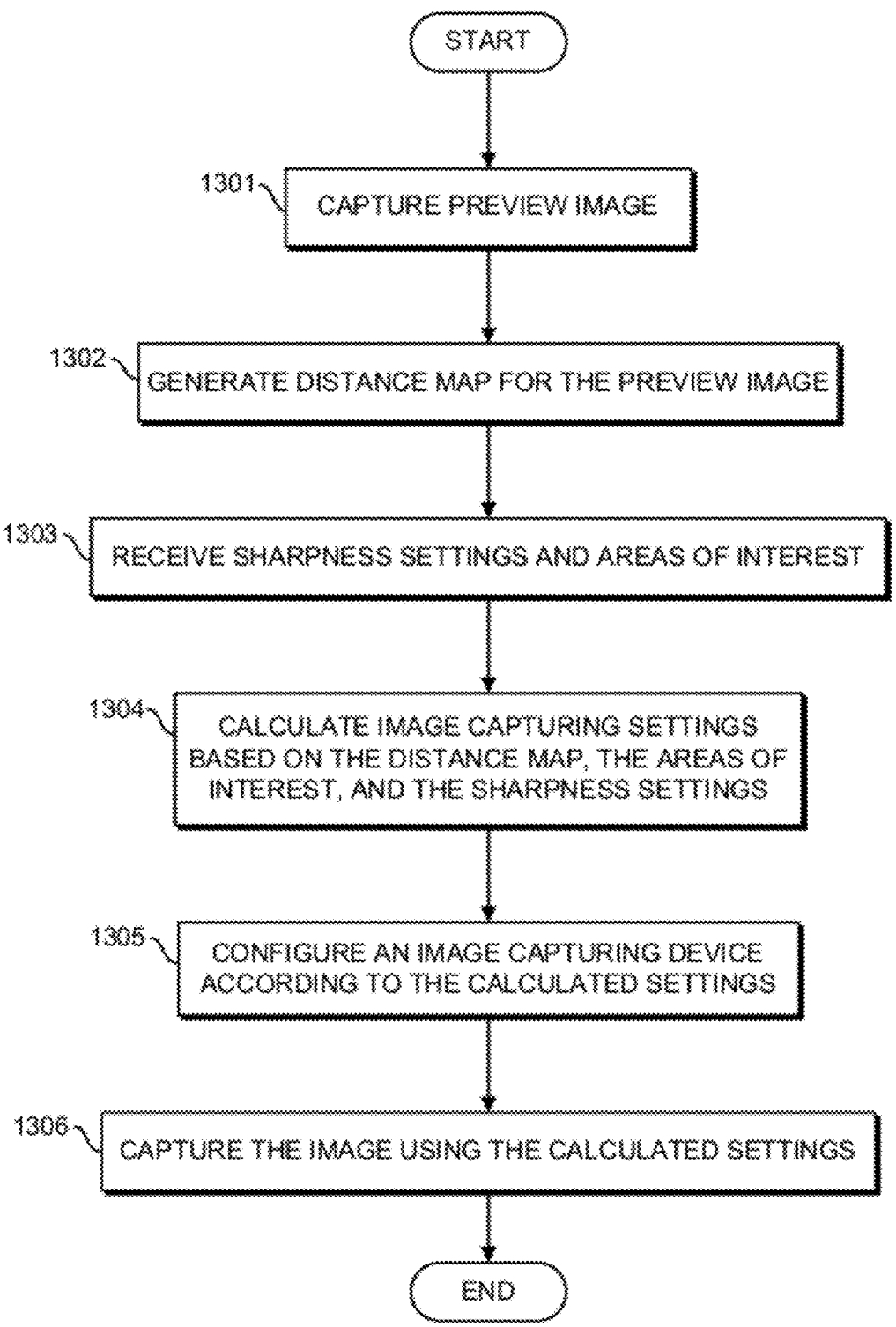
FIG. 13 illustrates an embodiment of a method for adjusting focal transitions in an image.
Figure 14A:
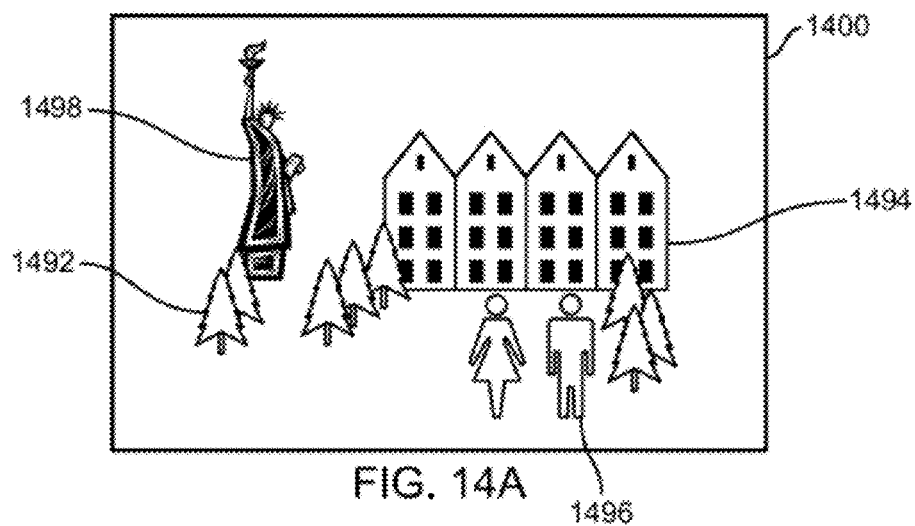
FIG. 14A illustrates an explanatory embodiment of a preview image.

FIG. 13 illustrates a flowchart of a method for adjusting focal transitions in an image. In block 1301, a preview image of a scene is captured. FIG. 14A illustrates an explanatory embodiment of a preview image 1400. In block 1302, a distance map is generated for the preview image. The distance map indicates respective distances between the image capturing device and the objects in the scene. Next, in block 1303, sharpness settings and areas of interest selections are received. The sharpness settings indicate sharpness settings for areas between the areas of interest and/or sharpness settings for the areas of interest (in some embodiments, the system may assume that the areas of interest should be as sharp as possible).

Figure 14B:
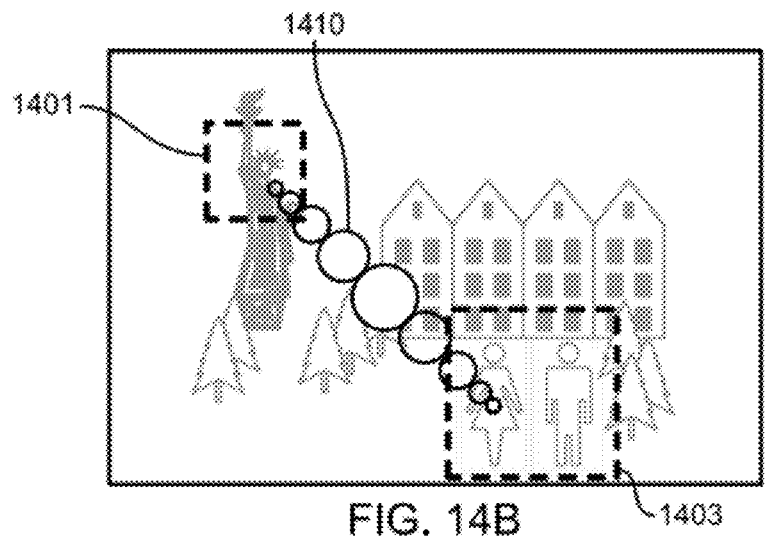
FIG. 14B illustrates an explanatory embodiment of a user interface for receiving sharpness settings.

FIG. 14B illustrates an explanatory embodiment of user interface for receiving sharpness settings. The user interface receives selections of a first area of interest 1401, a second area of interest 1403, and transitional sharpness settings 1410. The "bubbles" in the transitional sharpness settings 1410 represent the transition of sharpness settings. In one embodiment, the sharpness settings are described in the form of aperture settings. However, some users may be unfamiliar with aperture settings. Thus, focal settings can be represented in "sharpness", "in-focusness", blurriness, or the like. The sharpness settings (e.g., bubbles 1410) can be input in various ways, including touch screens, buttons, pointer devices, etc. In some embodiments, templates for sharpness settings are provided beforehand, and the user selects one of the sharpness settings templates for the transition between the first area of interest 1401 and the second area of interest 1403.

Figure 15:
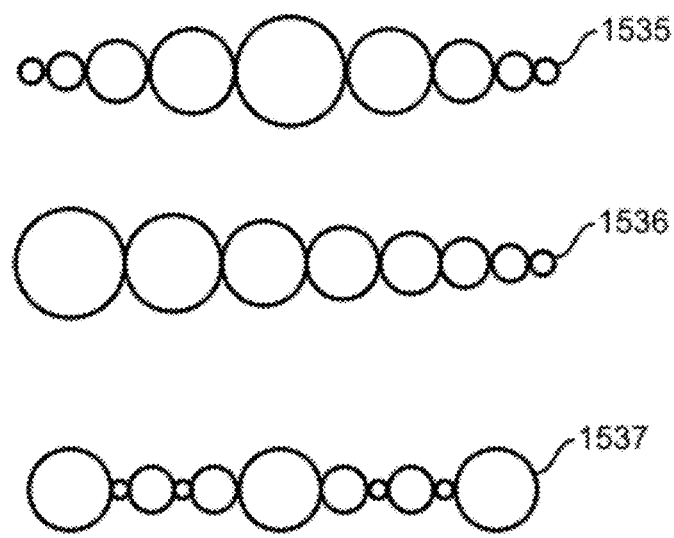
FIG. 15 illustrates three example templates of sharpness settings.

FIG. 15 illustrates three example templates 1535-1537 of sharpness settings. The size of a circle corresponds to the degree of the sharpness settings. In these examples, a smaller circle corresponds to a sharper sharpness setting. The sharpness settings of the template 1535-1537 may corresponds to depth in the image or two-dimensional coordinate position in the image, thus implementing a spatially-adjustable focus. For example if the first template 1535 is selected, if the sharpness settings are applied according to depth, and if two areas of interest are selected with respective depths A and B, then objects in the scene at the depth of A or B will be in focus. Since the largest circle is in the middle of the first template 1535, objects at the depth halfway between A and B (e.g., (A+B)/2) will be the least sharp.

If the sharpness settings of the first template 1535 are applied according to two-dimensional coordinate position in the image, then, if the first area of interest is at coordinates $x_1$, $y_1$ in the image, and the second area of interest is at coordinates $x_2$, $y_2$ in the image, objects at the coordinates $(x_1+x_2)/2$, $(y_1+y_2)/2$ in the image will be the least sharp.

Returning to FIG. 13, in block 1304, the image capturing settings are calculated (e.g., by a capture settings calculator, a focal transition module) based on the distance map, the areas of interest, and the sharpness settings. This calculation may include extrapolation operations and/or interpolation operations. The image capturing settings may be calculated by referring to an LUT.

For example, a preview image 1400 includes a tree 1492 at a distance of 80 meters, a statue 1498 at a distance of 10,000 meters, a building 1494 at a distance of 200 meters, and a person 1496 at a distance of 20 meters. The first area of interest 1401 includes the statue 1498, and the second area of interest 1403 includes the person 1496, both of which have a sharpness of selection of 1 (where 1=very sharp, 10=least sharp). The tree 1492 has a sharpness selection of 4, and the building 1494 has a sharpness selection of 7. To calculate the image capturing settings (e.g., the optical aperture) for the tree 1492, the sharpness selection (4) and the distance (80 meters) are input to the LUT, and the output for the optical aperture is 12.5. To calculate the image capturing settings for the statue 1498, the sharpness selection (1) and the distance (10,000 meters) are input to the LUT, and the output for the optical aperture is 21. To calculate the image capturing settings for the building 1494, the sharpness selection (7) and the distance (200 meters) are input to the LUT, and the output for the optical aperture is 18.6. Finally, to calculate the image capturing settings for the person 1496, the sharpness selection (1) and the distance (20 meters) are input to the LUT, and the output for the optical aperture is 9.6.

Figure 14C:
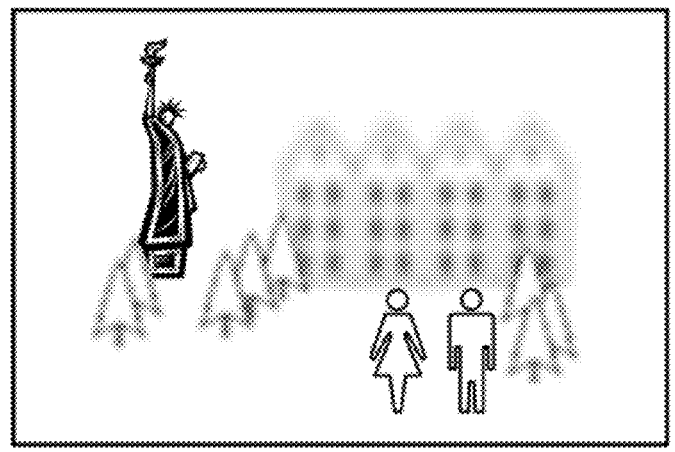
FIG. 14C illustrates an embodiment of a captured image which conforms to received sharpness settings.

In block 1305, an image capturing device is configured according to the calculated image capturing settings. In block 1306, an image is captured using the calculated settings (e.g., captured by an image capturing device). FIG. 14C illustrates an embodiment of a captured image which approximately conforms to sharpness settings received according to FIG. 14B. The areas of interest are sharper (though at different depths) than the other areas of the image.

Figure 16:
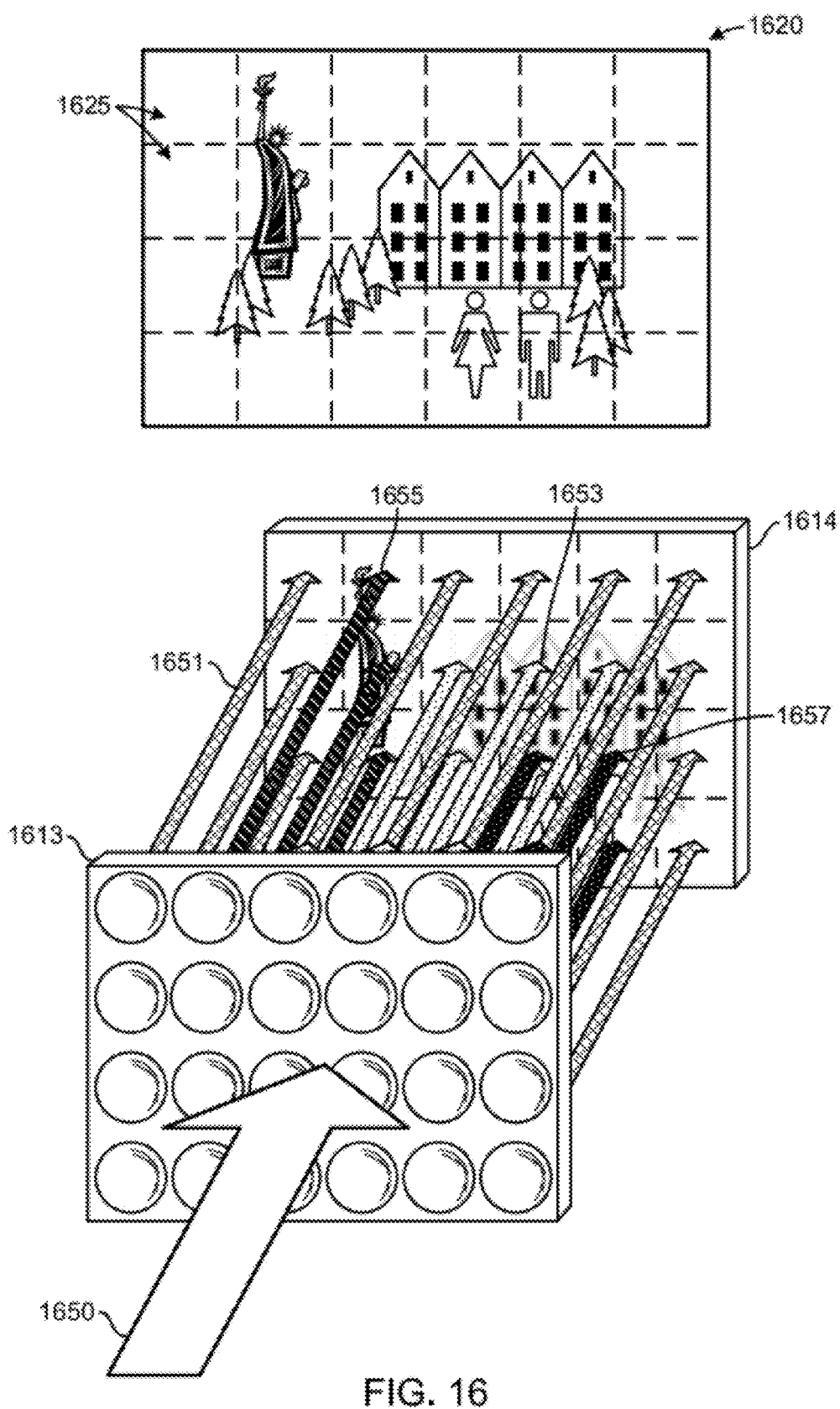
FIG. 16 illustrates an embodiment of a device for capturing transitional focal settings.

FIG. 16 illustrates an embodiment of a device for capturing transitional focal settings. The device divides an image 1620 into regions 1625. Though the illustrated image 1620 includes twenty-four regions 1625, other embodiments may include more or less regions. The device includes an optical array 1613 and a light sensor 1614. The optical array is an array of optical units. An optical unit may include an aperture and/or a lens, for example a reconfigurable lens, such as a liquid lens. The optical array has an optical unit that corresponds to a respective region 1625 in an image and on the light sensor 1614, and thus has twenty-four optical units.

When light 1650 from a scene strikes the optical array 1613, the light passes through an optical unit to a respective region on the light sensor 1614. In embodiments where the optical units are independently configurable, the light that strikes each region on the light sensor 1614 may be different from one or more other regions. In the embodiment shown, the optical units and the light transmitted thereby are configured to one of a first setting 1651, a second setting 1653, a third setting 1655, and a fourth setting 1657 (different configurations are shown in the texture of the arrows). The third setting 1655 configures optical units to capture a sharper image of a first area of interest 1401, and the fourth setting 1657 configures optical units to capture a sharper image (e.g., more focused image) of a second area of interest 1403. The first setting 1651 and the second setting 1653 configure optical units to capture less sharp images (e.g., less focused images) of the areas between the first are of interest 1401 and the second area of interest 1403. Thus, image capturing settings 1197 may define capturing settings for optical units based on the respective regions of an image that correspond to the optical units.

Figure 17:
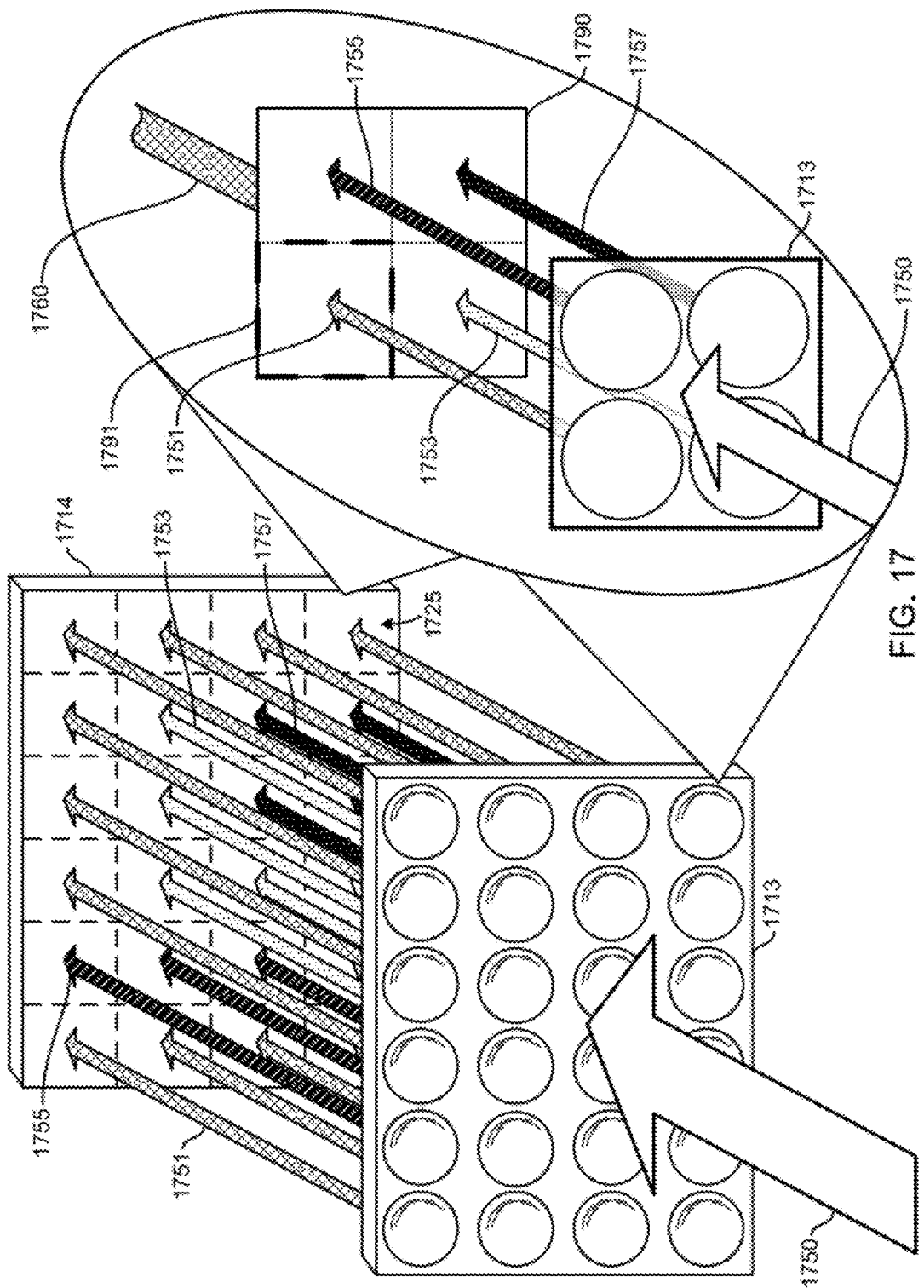
FIG. 17 illustrates an embodiment of a device for capturing transitional focal settings.

FIG. 17 illustrates an embodiment of a device for capturing transitional focal settings. The device includes an optical array 1713 and a light sensor 1714. The light sensor 1714 includes super-pixels, each of which includes four pixels. The light transmitted by optical units configured according to a first setting 1751, a second setting 1753, a third setting 1755, and a fourth setting 1757 are shown in FIG. 17. However, the light shown as transmitted is simplified to show the light recorded by the light sensor 1714. A super pixel 1790 receives light from the optical array that has been configured according to each of the four optical settings. For example, if the optical array is a multi-aperture array that includes four apertures, light that has passed through each of the four apertures may strike respective pixels of the super-pixel 1790. The super-pixel 1790 sends a signal 1760 based on a selected pixel 1791 of the super-pixel. Therefore, if the region on the light sensor is region 1725 and if the desired setting is the first setting 1751, the selected pixel 1791 of the super-pixel 1790 is the pixel that corresponds to the first setting 1751, and the signal 1760 output by the super-pixel 1790 is based on the selected pixel 1791. Thus, image capturing settings may define settings for optical units (e.g., an aperture configuration, a liquid lens configuration) and selections of pixels of respective super-pixels.

Figure 18:
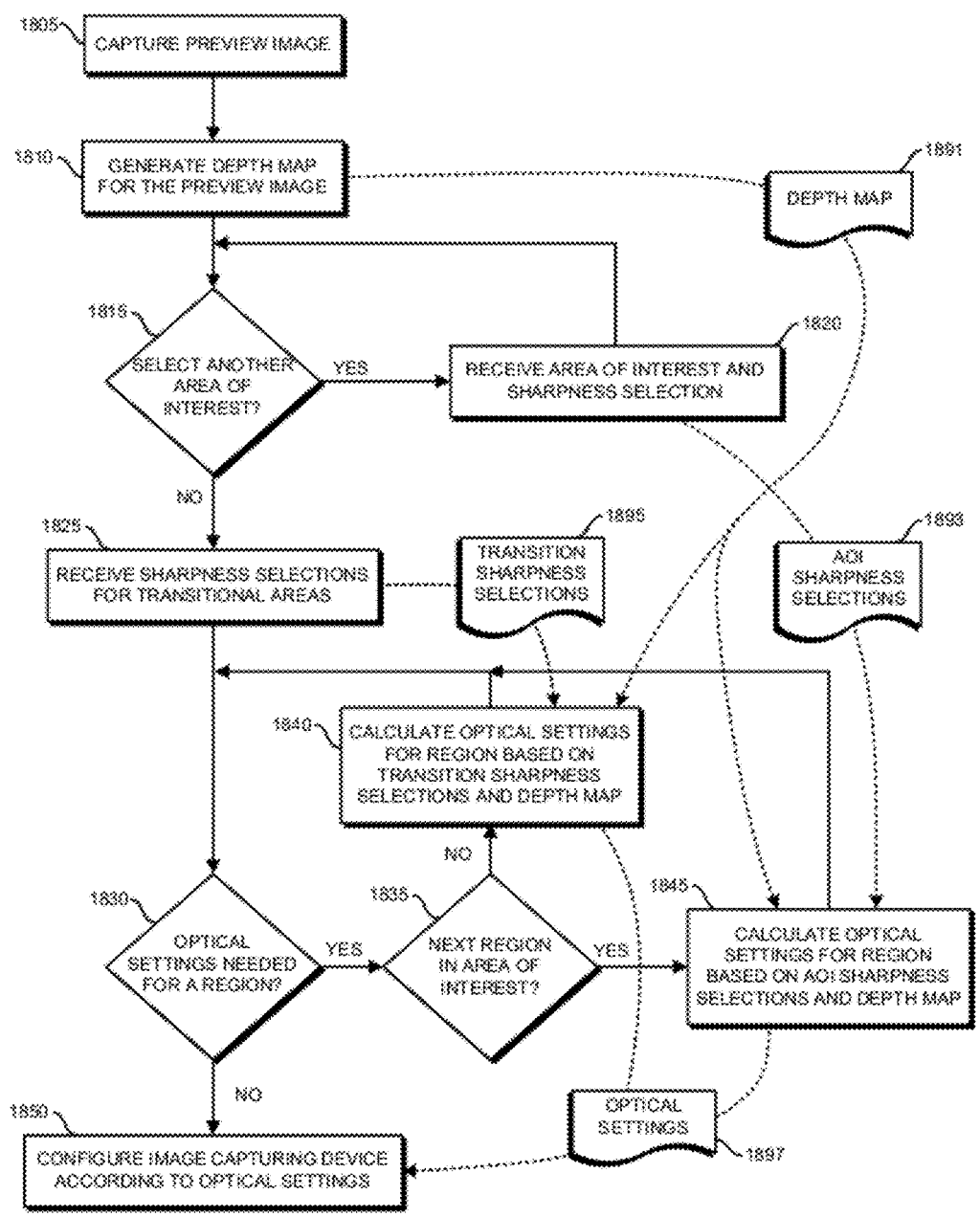
FIG. 18 illustrates an embodiment of a method for adjusting focal transitions in an image.

FIG. 18 illustrates an embodiment of a method for adjusting focal transitions in an image. Flow starts in block 1805, where a preview image is captured. Next, in block 1810, a depth map 1891 is generated based on the preview image. Flow then proceeds to block 1815, where it is determined if another area of interest will be selected. If yes, flow proceeds to block 1820, where an area of interest ("AOI") selection and a respective AOI sharpness selection 1893 is received. Flow then returns to block 1815. If in block 1815 it is determined that another area of interest is not to be selected, flow proceeds to block 1825, where transition sharpness selections 1895 are received for transitional areas in the image. Next, in block 1830, it is determined if optical settings need to be generated for a region (e.g., a region 1625) in an image. If yes (not all regions have had respective optical settings calculated), flow proceeds to block 1835, where it is determined if the region is in an area of interest (or has a predetermined overlap with an area of interest, such as 20%, 50%, 70%, etc.). If yes, flow proceeds to block 1845, where optical settings 1897 are calculated for the region based on the AOI sharpness selections 1893 and the depth map 1891. If no, flow proceeds to block 1840, where optical settings for the region are calculated based on transition sharpness selections 1895 and the depth map 1891. After blocks 1840 and 1845, flow returns to block 1830. Once all regions have had their respective optical settings calculated, flow proceeds to block 1850, where an image capturing device is configured according to the optical settings 1897.

The above described systems and methods can be achieved by supplying one or more computer-readable media having stored thereon computer-executable instructions for realizing the above described operations to one or more devices that are configured to read the computer-executable instructions stored in the one or more computer-readable media and execute them. In this case, the devices perform the operations of the above-described embodiments when executing the computer-executable instructions read from the one or more computer-readable media. Also, an operating system on the one or more devices may implement some of the operations of the above described embodiments. Thus, the computer-executable instructions and/or the one or more computer-readable media storing the computer-executable instructions therein constitute an embodiment.

Any applicable computer-readable medium (e.g., a magnetic disk (including a floppy disk and a hard disk), an optical disc (including a CD, a DVD, a Blu-ray disc), a magneto-optical disk, a magnetic tape, and semiconductor memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

While the above disclosure describes illustrative embodiments, the scope of the claims is not limited to these illustrative embodiments.

What is claimed is:

1. An image processing method comprising:
    receiving a user input indicating first and second areas of interest in a preview image;
    receiving one or more transition inputs indicating a transition of focal settings between the first area of interest and the second area of interest;
    determining focal settings over the preview image based on the user input and the transition input; and
    deriving a parameter to capture an image that conforms to the determined focal settings, wherein the parameter to capture an image is an aperture mask that defines two or more aperture settings for an aperture array.

2. The image processing method of claim 1, wherein a transition input is a sharpness parameter.

3. The image processing method of claim 1, further comprising displaying the transition of the focal settings.

4. The image processing method of claim 1, wherein the one or more transition inputs indicate one or more predetermined focal setting transition templates, wherein a focal setting transition template defines a transition of focal settings.

5. The image processing method of claim 1, wherein the determined focal settings indicate focal settings for the first area of interest, the second area of interest, and other areas of the preview image.

* * * * *